(12) United States Patent
Sacca et al.

(10) Patent No.: US 6,373,377 B1
(45) Date of Patent: Apr. 16, 2002

(54) POWER SUPPLY WITH DIGITAL DATA COUPLING FOR POWER-LINE NETWORKING

(75) Inventors: Frank Sacca, Diamond Bar; Alberto Mantovani, Laguna Niguel, both of CA (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/679,414

(22) Filed: Oct. 5, 2000

(51) Int. Cl.$^7$ .............................................. H04M 11/04
(52) U.S. Cl. ............................ 340/310.01; 340/310.06; 340/310.08
(58) Field of Search ....................... 340/310.01, 310.02, 340/310.03, 310.04, 310.05, 310.06, 310.07, 310.08, 870.3, 870.36, 870.39; 375/139, 142, 224, 220

(56) References Cited

U.S. PATENT DOCUMENTS

| | | | |
|---|---|---|---|
| 3,938,129 A | 2/1976 | Smither | 340/310.02 |
| 3,942,170 A | 3/1976 | Whyte | 340/310.07 |
| 3,967,264 A | 6/1976 | Whyte et al. | 340/310.08 |
| 4,004,110 A | 1/1977 | Whyte | 340/310.07 |
| 4,065,763 A | 12/1977 | Whyte et la. | 340/310.05 |
| 4,188,619 A | 2/1980 | Perkins | 340/310.05 |
| 4,254,402 A | 3/1981 | Perkins | 340/310.07 |
| 4,355,303 A | 10/1982 | Phillips et al. | 340/310.02 |
| 4,377,804 A | 3/1983 | Suzuki | 340/310.02 |
| 4,400,688 A | 8/1983 | Johnston et al. | 340/310.02 |
| 4,433,284 A | 2/1984 | Perkins | 340/310.05 |
| 4,438,519 A | 3/1984 | Bose | 375/139 |
| 4,471,399 A | 9/1984 | Udren | 340/310.02 |
| 4,473,816 A | 9/1984 | Perkins | 340/310.05 |
| 4,473,817 A | 9/1984 | Perkins | 340/310.05 |
| 4,517,748 A | 5/1985 | Rudolph et al. | 33/600 |
| 4,556,864 A | 12/1985 | Roy | 340/310.06 |

(List continued on next page.)

OTHER PUBLICATIONS

Edward H. Frank et al., Connecting The Home With A Phone Line Network Chip Set, © 2000 IEEE, IEEE Micro, Mar.–Apr. 2000, pp. 1–12.

The Home Phoneline Networking Alliance, © 1998 Home-PNA, Jun. 22, 1998, 13 pages.

Conexant, Application Overview: Home Networking Using Existing Residential Phonelines, pp. 1–36.

Intellon, No New Wires™, Intellon High Speed Power Line Communications, Revision 2, 26001119, © 1999 Intellon Corp., Jul. 1999, pp. 1–6.

(List continued on next page.)

Primary Examiner—Van Thanh Trieu
(74) Attorney, Agent, or Firm—Akin, Gump, Strauss, Hauer & Feld, L.L.P.

(57) ABSTRACT

A power supply provides digital data coupling for power-line networking. The power supply includes a power supply side digital interface to transmit and receive a digital data passed through a digital coupler to and from a power-line network access circuitry side digital interface of power-line network access circuitry. The power supply further includes a digital-to-analog converter to process digital data into a high-frequency analog data carrier to provide to a power line of a power-line network. An analog-to-digital converter of the power supply converts a high-frequency analog data carrier from the power line into digital data for the power-line network access circuitry. A power-line analog front end of the power supply transmits and receives the high-frequency analog data carrier to and from the power line. Digital data exchanged between the power supply and the network access circuitry may include control signals for a control circuitry of the power supply. Control circuitry of the power supply may handle control of the digital-to-analog converter, the analog-to-digital converter and the analog front end.

23 Claims, 1 Drawing Sheet

U.S. PATENT DOCUMENTS

| | | | | |
|---|---|---|---|---|
| 4,556,865 A | 12/1985 | Fukagawa et al. | ..... | 340/310.03 |
| 4,599,598 A | 7/1986 | Komoda et al. | ........ | 340/310.02 |
| 4,611,274 A | 9/1986 | Machino et al. | ........ | 340/310.01 |
| 4,620,257 A | * 10/1986 | Sano et al. | .................... | 361/68 |
| 4,636,771 A | 1/1987 | Ochs | ..................... | 340/310.05 |
| 4,641,322 A | 2/1987 | Hasegawa | .............. | 340/310.02 |
| 4,766,414 A | 8/1988 | Shuey | .................... | 340/310.05 |
| 4,809,296 A | 2/1989 | Braun et al. | ........... | 340/310.02 |
| 4,815,106 A | 3/1989 | Propp et al. | ........... | 340/310.03 |
| H678 H | 9/1989 | Baker et al. | ........... | 340/310.02 |
| 4,864,589 A | 9/1989 | Endo | ......................... | 375/141 |
| 4,918,640 A | 4/1990 | Heimsch et al. | ............ | 708/670 |
| 4,962,496 A | 10/1990 | Vercellotti et al. | ....... | 340/10.02 |
| 4,974,199 A | * 11/1990 | Verbanets, Jr. et al. | ....... | 710/17 |
| 5,090,024 A | 2/1992 | Vander Mey et al. | ....... | 375/139 |
| 5,148,144 A | 9/1992 | Sutterlin et al. | ......... | 340/10.01 |
| 5,185,591 A | 2/1993 | Shuey | .................... | 340/10.02 |
| 5,192,231 A | 3/1993 | Dolin, Jr. | .................... | 439/620 |
| 5,241,283 A | 8/1993 | Sutterlin | ...................... | 330/51 |
| 5,257,006 A | 10/1993 | Graham et al. | ........ | 340/310.06 |
| 5,263,046 A | 11/1993 | Vander Mey | ............... | 375/139 |
| 5,278,862 A | 1/1994 | Vander Mey | ............... | 375/139 |
| 5,289,500 A | * 2/1994 | Inou et al. | ................... | 375/224 |
| 5,359,625 A | 10/1994 | Vander Mey et al. | ....... | 375/142 |
| 5,391,932 A | 2/1995 | Small et al. | ........... | 340/310.08 |
| 5,404,127 A | 4/1995 | Lee et al. | .............. | 340/310.02 |
| 5,424,710 A | 6/1995 | Baumann | ............... | 340/310.01 |
| 5,485,040 A | 1/1996 | Sutterlin | ................ | 340/310.07 |
| 5,491,463 A | 2/1996 | Sargeant et al. | ....... | 340/310.01 |
| 5,574,748 A | 11/1996 | Vander Mey et al. | ....... | 375/139 |
| 5,581,289 A | 12/1996 | Firl et al. | ................... | 347/104 |
| 5,777,544 A | 7/1998 | Vander Mey et al. | ... | 340/310.06 |
| 5,793,820 A | 8/1998 | Vander Mey | ............... | 375/350 |
| 5,818,821 A | 10/1998 | Schurig | ................. | 340/310.06 |
| 5,870,016 A | 2/1999 | Shrestha | ................ | 340/310.02 |
| 6,034,988 A | 3/2000 | VanderMey et al. | ........ | 375/134 |
| 6,074,086 A | 6/2000 | Yonge, III | .................. | 708/422 |
| 6,081,586 A | 6/2000 | Rahamim et al. | ........ | 379/93.29 |

OTHER PUBLICATIONS

Intellon, No New Wires™, White Paper #0032, OFDM Communications Primer, Revision 5, 26001080, © 1999 Intellon Corp., Mar. 1999, pp. 1–6.

Intellon, No New Wires™, Support: PowerPacket FAQs, © 2000 Intellon, Inc., pp. 1–3.

Intellon, No New Wires™, Products: PowerPacket™, High Speed Home Powerline Networking Technology, © 2000 Intellon, Inc., pp. 1–2.

Intellon, No New Wires™, Press: 2000 Press Releases, Intellon Unveils PowerPacket, The Fastest Working Silicon for Powerline Networking Technology, © 2000, Intellon, Inc., pp. 1–2.

ASPnews.com, Group Seeks Powerline Networking Standards, © 1999–2000 internet.com Corp., pp. 1–2.

Patrick Spreng, Standards Watch: HomePlug Selects Intellon's PowerPacket For Powerline Home Networking Specification, Decision by Industry Technical Experts Sanctions PowerPacket As Premier Powerline Technology for Connecting the Digital Home, Jun. 14, 2000, Data.com. pp. 1–2.

HomePlug™, The HomePlug Powerline Alliance, Background Paper, Apr. 2000, © 2000 HomePlug, pp. 1–2.

HomePlug™, Powerline Alliance, Overview, © HomePlug, 1 page.

HomePlug™, HomePlug Powerline Alliance Selects Baseline Technology, Jun. 5, 2000, ©2000 HomePlug, pp. 1–2.

HomePlug™, Leading Technology Companies Form Alliance to Establish Specification for High Speed Powerline Home Networking, Apr. 10, 2000, © 2000 HomePlug, pp. 1–2.

Inari™, Inari Powerline Networking Technology, Powerline Networking Technology (PNT) White Paper, Dec. 1999, pp. 1–6.

Inari™, Company Background, pp. 1–2.

Inari™, Data Sheets, IPL0201—2 Mbps Powerline Network Controller Preliminary, pp. 1–2.

P. Michael Henderson, Peaceful coexistence in home LANs, EE Times, Nov. 30, 1999, © 2000 CMP Media Inc., http://www.eet.com/story/OEG19991129S0047, pp. 1–6.

HomePNA—News and Events, Home Phoneline Networking Alliance (HomePNA) Publishes Progressive 2.0 Specification, Dec. 1, 1999, © 2000 Home Phoneline Networking Alliance, http://www.homepna.org/news/press/pressr12.htm, pp. 1–2.

Altcom Powerline Local Area Network, http://www.alt--com.net/Aplan/index.html, pp. 1–4.

Conexant™, LANfinity™ RS7112, Multifunction Ethernet Controller with Integrated HomePNA 1.0 Physical Layer, Single–Chip Controller Combines Home Networking with High–Speed Internet Access Capability, 4 pages.

Conexant™, Home Networking, Bringing Broadband and Networking to the Home, Innovative Technologies Simultaneously Share Internet Access, Computers, Peripherals, and Telephone Services Over a Home's Existing Phonelines.

Conexant™, LANfinity™, CN7221, Home Networking Physical Layer Device with Integrated Analog Front End Circuitry, Data Sheet Order No. LAN–056, Rev. A, Mar. 12, 1999, © 1999 Conexant Systems, Inc., pp. 1–18.

Echelon®, Echelon's Lonworks® Products, 1999 Edition, Version A, pp. 1–48.

Echelon®, Power Line Communications, www.echelon.com/solutions/markets/plct.pdf, May 16, 1997, pp. 2–29.

Echelon®, Power Line Communication Tutorial, www.echelon.com/solutions/markets/plct.pdf, May 28, 1997, pp. 1–22.

Cahners EDN Access, Hands–on project: Home–network contenders steer a collision course, http://www.ednmag.com/ednmag/reg/1999/112499/24df1.htm, © 2000 Cahners Business Information, Nov. 24, 1999, pp. 1–6.

Intellon, No New Wires™, Press: 2000 Press Releases, HomePlug Powerline Alliance Selects Intellon's Power-Packet™ Technology for the New Powerline Home Networking Specification, © 2000 Intellon, Inc., Jun. 5, 2000, pp. 1–2.

Intellon, No New Wires™, Press: 2000 Press Releases, Intellon Announces Its Founding Membership With the Newly Formed HomePlug™ Powerline Alliance, © 2000 Intellon, Inc., Apr. 11, 2000, pp. 1–2.

Intellon, No New Wires™, Press: 2000 Press Releases, Intellon Unveils PowerPacket, The Fastest Working Silicon for Powerline Networking Technology, © 2000 Intellon, Inc., Feb. 7, 2000, pp. 1–2.

Intellon, No New Wires™, High Speed Powerline Network Technology, HomePlug Powerline Alliance selects Intellon's PowerPacket™ Technology for the new Powerline Home Networking Specification, © Intellon, Inc., 1 page.

Intellon, No New Wires™, Press: 2000 Press Releases, Intellon's PowerPacket™ Technology Delivers 14 Mbps In Home Networking Field Tests, © Intellon, Inc., May 3, 2000, pp. 1–2.

ServIng Ingenieruleistungen GmbH—Principles of power line communication, Sending data via the power line?, http://www.serving.technopark–bs.de/SI_seiten/SI_pw1_prinzip_english.htm1, 1 page.

Universität GHS Essen, Program International Symposium on Power–Line Communications and its Applications, http://www.exp–math.uni–essen.de/Events/Tagung.htm1, Apr. 2–4, 1997, pp. 1–4.

Multiplex Digital Communication on DC BUS Power Line, http://www.matimop.org.il/newrdinf/projects/1155.htm, 1 page.

LAN Switching, http://www.cisco.com/univercd/cc/td/doc/cisintwk/ics/cs010.htm, © 1989–2000 Cisco Systems Inc., Feb. 9, 2000, pp. 1–6.

AC006: MEDIAN—Wireless Broadband CPN/LAN for Professional and Residential Multimedia Applications, http://media.it.kth.se/SONAH/Acts/AC006.htm1, pp. 1–2.

\* cited by examiner

POWER SUPPLY WITH DIGITAL DATA COUPLING FOR POWER-LINE NETWORKING

BACKGROUND OF THE INVENTION

1. Field of the Invention

The present invention generally relates to power-line networking and more particularly to a power supply with digital data coupling for power-line networking.

2. Description of the Related Art

There has recently been a growing interest in the use of power lines for high-speed data networking. For instance, the HomePlug™ Powerline Alliance was formed to enable and promote the rapid availability and adoption of cost effective, interoperable and standards-based power-line home networks and products. To date, power-line networking technology delivering 14 Mbps networking speeds over residential (home) power lines has been demonstrated. With a high-speed power-line network, it is expected that virtually any electronic device found in the home may be networked through the power line.

For a power-line home network, direct current (DC) power in a computer system has been generated on an isolated or computer system side of a power supply, typically a switching power supply. Power-line network access circuitry such as a power-line analog front end (AFE), a digital-to-analog converter (DAC) and an analog-to-digital converter (ADC) has been driven by DC voltage from the system power. In order to drive a power line, a transformer has been necessary in the AFE for isolating the computer system side (isolated side) from the power line side (non-isolated side). Given the relatively low DC voltages typically used by integrated circuitry in the AFE on the isolated side, a transformer has also been necessary to achieve an adequate signal voltage level needed to drive a data carrier on a power line or power-line networking. However, the use of a transformer to amplify the power line data carrier increases the output impedance of the transmitter driver and introduces undesirable attenuation in the receive path. The isolated side typically provides DC voltages of +3.3 volts, +5 volts and +/−12 volts. With 3.3 volts, which is typical of most cost-effective AFE integrated circuitry, it would be very costly and difficult, if at all possible, to directly drive a data carrier into the power line with an adequate signal amplitude. As a result, an extra chip is required as a large signal amplifier driver having a larger power supply voltage of +/−12 volts to obtain adequate voltage swing to drive a data carrier onto the power line.

SUMMARY OF THE INVENTION

Briefly, a power supply provides digital data coupling for power-line networking. The power supply includes a power supply side digital interface to transmit and receive a digital data passed through a digital coupler to and from a power-line network access circuitry side digital interface of power-line network access circuitry. The power supply further includes a digital-to-analog converter to process digital data into a high-frequency analog data carrier to provide to a power line of a power-line network. An analog-to-digital converter of the power supply converts a high-frequency analog data carrier from the power line into digital data for the power-line network access circuitry. A power-line analog front end of the power supply transmits and receives the high-frequency analog data carrier to and from the power line. Digital data exchanged between the power supply and the network access circuitry may include control signals for a control circuitry of the power supply. Control circuitry of the power supply may handle control of the digital-to-analog converter, the analog-to-digital converter and the analog front end.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF PREFERRED EMBODIMENT

Figure 1:
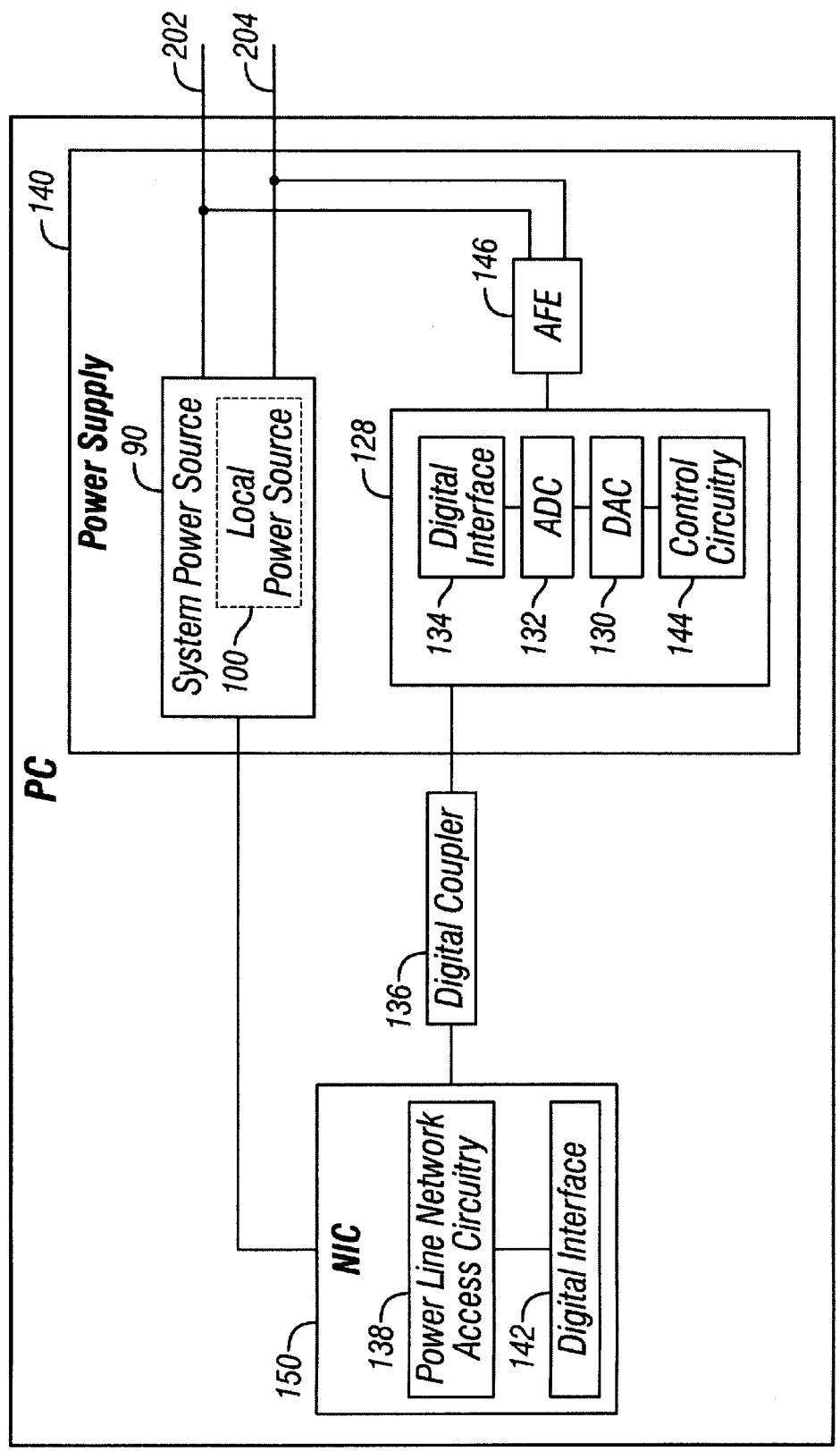
FIG. 1 is a diagram of an exemplary computer system for power-line home networking illustrating digital data coupling.

The following patent applications and patents are incorporated herein by reference in their entirety for all purposes:

Commonly-assigned U.S. patent application, Attorney Docket No. 99RSS496, entitled "POWER SUPPLY ARCHITECTURE FOR POWER-LINE NETWORKING," filed concurrently herewith;

Commonly-assigned U.S. patent application, Attorney Docket No. 00CXT0508C, entitled "POWER LINE NETWORKING APPARATUS AND METHOD," filed concurrently herewith;

Commonly-assigned U.S. patent application, Attorney Docket No. 00CXT0267US, entitled "POWER SUPPLY WITH SMALL-SIGNAL COUPLING FOR POWER-LINE NETWORKING," filed concurrently herewith; and Commonly-assigned U.S. Pat. No. 6,081,586, entitled "MODEM HAVING A PROGRAMMABLE UNIVERSAL DATA ACCESS ARRANGEMENT," granted on Jun. 27, 2000.

Referring to FIG. 1, a computer system PC for power-line networking is shown. Power-line network access circuitry 138 is coupled through a digital interface 142 (serial, parallel or a combination thereof) to a power supply 140. The power-line network access circuitry 138, which may be part of a Peripheral Component Interconnect (PCI) card, provides digital data through the digital interface 142 and receives digital data from the digital interface 142. The PCI card may be, for example, a network interface card (MC) 150. Power-line network access circuitry generally refers to circuitry for transmission or reception of data over a power line or circuitry for processing such data to or from a host controller. The digital interface 142 generally includes a transmitter to transmit digital data to the power supply 140 and a receiver to receive digital data from the power supply 140. The digital data may include streaming audio, streaming video, Internet data, telephony content, broadband content or multimedia content, for example. In addition to data signals, the digital data may include control signals such as AFE, ADC and DAC control signals and clock synchronization signals. One example of communication of data and control signals through a digital interface can be found in the commonly-assigned U.S. Pat. No. 6,081,586, entitled "MODEM HAVING A PROGRAMMABLE UNIVERSAL DATA ACCESS ARRANGEMENT," previously incorporated herein. While a computer system is shown, it should be understood that electronic devices or appliances other than a computer system may be provided on the power-line network. Examples of other electronic devices or appliances include speakers, audio systems, digital audio jukeboxes, terminals, Internet or smart appliances, game machines, security systems, set-top boxes, televisions, video cassette recorders, printers, cameras and the like.

The power supply 140 is adapted for digital data coupling to the NIC 150. A digital coupler 136 generally defines a bidirectional communication interface between the NIC 150 and the power supply 140. The digital coupler 136 represents a digital communication channel between the NIC 150 and the power supply 140. On the NIC (or PCI card or power-line network access circuitry) side, the digital coupler 136 is coupled to the digital interface 142. The digital data from the digital interface 142 is communicated to the power-line network access circuitry 138. On the power supply side, the digital coupler 136 is coupled to a circuitry block 128 described below.

With the digital coupler 136, data signals are transmitted or received between the power-line network access circuitry side and the power supply side in digital form. The digital coupler 136 may be implemented as a direct parallel connection, serial connection or a combination thereof. For example, data can be sent with a parallel interface while control signals are coupled with a serial interface, depending on the speed of the digital interface and the required control data rate. The digital coupler 136 may be direct, capacitive, resistive, inductive, optical or a combination thereof. The digital data provided through the digital coupler 136 may be modulated over a high-frequency digital data carrier for transmission through the digital coupler 136.

The circuitry block 128 includes the digital interface 134, a DAC 130, an ADC 132 and control circuitry 144. The digital interface 134 couples digital data to and from the digital coupler 136. The digital interface 134 may, for example, be a digital parallel and/or serial interface that supports high data speeds such as those greater than 400 or 500 Mbps. The DAC 132 converts digital data from the digital interface 134 to analog form to be transmitted to the power line. The ADC 130 converts analog data signals received from the power line to be provided to the digital interface 134 into digital form. The control circuitry 144, which may be accessed through the digital interface 134, may handle control of the DAC 132, the ADC 130, the digital interface 134 and an AFE 146.

Coupled to the circuitry block 128 is the AFE 146. The AFE 146 amplifies a small-signal analog data carrier from the DAC 132 into a large-signal analog data carrier for transmission to the power line at an adequate power level. An example of an AFE is described in detail in the commonly-assigned U.S. patent application, Attorney Docket No. 00CXT0267US, entitled "POWER SUPPLY WITH SMALL-SIGNAL COUPLING FOR POWER-LINE NETWORKING," previously incorporated herein by reference. Alternatively, the AFE 146 can be an AFE known in the art. Like the circuitry block 128, the AFE 146 is powered by its connection to the positive side of a local power source 100 which may be a dedicated DC power source internal or local to the power supply 140. The local power source 100 may be a subsection of a system power source 90, which specifically provides power to the AFE 146 and the circuitry block 128. The local power source 100 may be isolated or non-isolated with respect to the power supply 140 that provides power to the NIC 150. If the digital coupler 136 provides isolation, the local power source 100 can be non-isolated with respect to the power line. If the digital coupler 136 is isolated, for example, the local power source 100 can be referenced to the power line and may be derived from a winding (primary or secondary) of the system power source 90 to lower overall system cost. It should be understood that the local DC power source 100 may be implemented in a variety of ways.

The power supply 140 connects to a power line through a hot (H) terminal 202 and a neutral (N) terminal 204. The AFE 146 may be coupled through the H terminal 202 and the N terminal 204 either directly (in the non-isolated case) such as described in the commonly-assigned U.S. patent application, Attorney Docket No. 00CXT0267US, entitled "POWER SUPPLY WITH SMALL-SIGNAL COUPLING FOR POWER-LINE NETWORKING," or through an isolation transformer (in the isolated case), such as described in the commonly-assigned U.S. patent application, Attorney Docket No. 00CXT0508C, entitled "POWER LINE NETWORKING APPARATUS AND METHOD."

Since the power supply 140 generally is implemented as a switching power supply which is known to generate high-frequency noise at its input terminal, it may useful to couple a filter between the input terminal of the system power source and the power line node where the AFE 146 is coupled to improve signal-to-noise ratio. One example of such a filter is described in the commonly-assigned U.S. patent application, Attorney Docket No. 00CXT0508C, entitled "POWER LINE NETWORKING APPARATUS AND METHOD," previously incorporated herein.

In accordance with digital data coupling for a power supply, a power-line AFE may be entirely contained in a power supply. No portion of the AFE therefore needs to be provided on the power-line network access circuitry side. By providing the AFE in a power supply, the AFE does not need to be isolated from the power line, provided that the digital coupler is isolated. With respect to power-line networking, another potential advantage of digital data coupling is that the power supply becomes a standalone, self-contained device that handles communication with the power line. In this way, the power supply alone is subject to Federal Communications Commission (FCC) compliance and the PC card manufacturer does not have to obtain FCC compliance for the NIC with respect to power-line networking. Further, with digital data coupling, power-line networking is no longer constrained by the DC voltage levels available on the power-line network access circuitry side. For example, by supporting digital data coupling between a NIC and a power supply, an adequate voltage swing to drive a data carrier onto a power line is achieved without relying upon the low voltage levels used for the NIC.

The foregoing disclosure and description are illustrative and explanatory thereof, and various changes in the details of the power supply, digital coupling, digital interface and power-line networking, as well as the illustrated apparatus and construction and method of operation may be made without departing from the spirit of the invention.

We claim:

1. A power supply adapted for digital data coupling, the power supply comprising:
    a power supply side digital interface to transmit and receive digital data to and from a power-line network access circuitry side digital interface of power-line network access circuitry; and
    a power-line analog front end to transmit and receive a high-frequency analog data carrier corresponding to the digital data over a power line.

2. The power supply of claim 1, further comprising:
    a digital-to-analog converter to convert the digital data into a high-frequency analog data carrier to provide to a power line for power-line networking.

3. The power supply of claim 1, wherein a digital coupler passes the digital data between the power supply side digital interface and the power-line network access side digital interface.

4. The power supply of claim 1, wherein a digital coupler provides coupling between the power supply digital interface and the power-line network access circuitry side digital interface.

5. The power supply of claim 1, further comprising:

control circuitry to control the power-line analog front end.

6. The power supply of claim 1, wherein the power-line network access circuitry is part of a network interface card of a computer system.

7. The power supply of claim 1, further comprising:

an analog-to-digital converter to convert the high-frequency analog data carrier from the power line into the digital data.

8. The power supply of claim 7, wherein the power supply side digital interface provides the digital data from the analog-to-digital converter to the power-line network access circuitry side digital interface.

9. A power-line network adapted for power-line networking, comprising:

power-line network access circuitry, comprising:

a power-line network access circuitry side digital interface to transmit digital data; and a power supply, comprising:

a power supply side digital interface to receive the digital data; and a power-line analog front end to transmit and receive a high-frequency analog data carrier corresponding to the digital data over a power line; and a digital coupler to transmit the digital data between the power supply side digital interface and the power-line network access circuitry side digital interface.

10. The network of claim 9, the power supply further comprising:

a digital interface coupled to the digital coupler to communicate the digital data between the digital coupler and the power-line network access circuitry side digital interface.

11. The network of claim 9, wherein the digital coupler comprises a fiber optic coupler providing optical coupling between the power supply side digital interface and the power-line network access circuitry side digital interface.

12. The network of claim 9, wherein the power-line network access circuitry is part of a network interface card of a computer system.

13. The network of claim 9, further comprising:

an analog-to-digital converter to convert the high-frequency analog data carrier from the power line into the digital data.

14. The network of claim 13, wherein the power supply side digital interface provides the digital stream from the analog-to-digital converter through the digital barrier to the power-line network access circuitry side digital interface.

15. The network of claim 9, wherein the power supply is part of an electronic device of the power-line network.

16. The network of claim 15, wherein the electronic device comprises a computer system.

17. The network of claim 9, the power supply further comprising:

a digital-to-analog converter to convert the digital data from the power supply side digital interface into a high-frequency analog data carrier to provide to a power line of a power-line network.

18. A method of digital data coupling for power-line networking, the method comprising the steps of:

receiving a digital data by a digital coupler of a power supply from a power-line network access circuitry side digital interface of power-line network access circuitry; and passing the digital data through the digital coupler to a power supply side interface of the power supply.

19. The method of claim 18, further comprising the step of:

converting the digital data into a high-frequency analog data carrier to provide to a power line of a power-line network.

20. The method of claim 18, further comprising the step of:

transmitting the high-frequency analog data carrier from the power line to the power supply digital interface.

21. The method of claim 18, wherein the digital coupler provides coupling between the power supply digital interface and the power-line network access circuitry side digital interface.

22. The method of claim 18, further comprising the step of:

transmitting the digital data by the digital coupler from the power supply side digital interface to the power-line network access circuitry side digital interface.

23. The method of claim 18, wherein the power-line network access circuitry is part of a network interface card of a computer system.

* * * * *